(12) United States Patent
Yoon (10) Patent No.: US 6,884,949 B2
(45) Date of Patent: Apr. 26, 2005

(54) MAIN SWITCH CONVEYING APPARATUS FOR VACUUM CIRCUIT BREAKER

(75) Inventor: Seok-Jung Yoon, Cheongju (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 10/822,719

(22) Filed: Apr. 13, 2004

(65) Prior Publication Data

US 2004/0212943 A1 Oct. 28, 2004

(30) Foreign Application Priority Data

Apr. 24, 2003 (KR) .............................. 10-2003-0026087

(51) Int. Cl.[7] .............................................. H02B 11/00
(52) U.S. Cl. .................................... 200/50.26; 361/609
(58) Field of Search ................ 200/50.26, 50.21–50.27, 200/50.01, 2; 218/155; 361/601, 615, 605–610, 616, 617, 723–727

(56) References Cited

U.S. PATENT DOCUMENTS

| | | | | |
|---|---|---|---|---|
| 2,826,722 A | * | 3/1958 | Zautner et al. ............. | 361/608 |
| 3,920,939 A | * | 11/1975 | Ciboldi et al. ........... | 200/50.22 |
| 5,459,293 A | * | 10/1995 | Hodkin et al. ........... | 200/50.26 |
| 5,757,260 A | * | 5/1998 | Smith et al. ............. | 200/50.21 |
| 6,066,814 A | * | 5/2000 | Smith et al. ............. | 200/50.24 |
| 6,160,228 A | * | 12/2000 | Gerbert-Gaillard et al. ...... | 200/50.21 |
| 6,388,868 B1 | * | 5/2002 | Leccia et al. ................ | 361/607 |
| 6,490,149 B2 | * | 12/2002 | Shichida et al. ............ | 361/605 |

FOREIGN PATENT DOCUMENTS

| | | | | |
|---|---|---|---|---|
| DE | 10006427 | | 7/2002 | |
| GB | 2338601 A | * | 12/1999 | ......... H02B/11/133 |
| KR | 2000-0013900 | | 3/2000 | |

OTHER PUBLICATIONS

English translation of abstract of DE 100 06 427.

* cited by examiner

Primary Examiner—Elvin Enad
Assistant Examiner—M. Fishman
(74) Attorney, Agent, or Firm—Greenblum & Bernstein, P.L.C.

(57) ABSTRACT

Disclosed is a main switch conveying apparatus for a vacuum circuit breaker. The main switch conveying apparatus for a vacuum circuit breaker installed in a cage having electrical load and source terminals, the main switch conveying apparatus includes a carriage for conveying the main switch loaded on the carriage in such a manner that the main switch is coupled to or separated from the terminals, a carriage actuating assembly including a lead screw for providing a driving force to move the carriage and provided with braking recesses at the predetermined positions on the lead screw in such a manner that the carriage is stopped at a test position, a safety position and a run position of the main switch, and a conveying nut fixed on the carriage to mesh with the lead screw and movable together with the carriage relatively to the lead screw, a girder assembly detachably supported on both front sidewalls of the cage for supporting one end of the lead screw to rotate, a brake assembly installed on the carriage for stopping the carriage by locking the lead screw at positions of the braking recesses; and a brake releasing assembly for releasing the locking of the brake assembly. The carriage having the main switch loaded thereon moves along the lead screw, while allowing the main switch to be positioned in the safety, test and run positions of the main switch. The user easily recognizes the position of the main switch. If the main switch conveying apparatus is inversely operated, the movement of the main circuit is stopped so that the main circuit is precisely and rapidly moved.

9 Claims, 11 Drawing Sheets

FIG. 2

PRIOR ART

FIG. 3

PRIOR ART

FIG. 4

PRIOR ART

FIG. 5

PRIOR ART

FIG. 6

PRIOR ART

MAIN SWITCH CONVEYING APPARATUS FOR VACUUM CIRCUIT BREAKER

BACKGROUND OF THE INVENTION

1. Field of the Invention

The present invention relates to a main switch conveying apparatus for a vacuum circuit breaker, and more particularly to a conveying apparatus capable of conveying a main switch of a vacuum circuit breaker in such a manner that the main switch can be coupled/separated to/from an electric load or source terminals installed at a rear position of a cage of the vacuum circuit breaker and can be stopped at a safety position, a test position, and a run position of the vacuum circuit breaker.

2. Description of the Prior Art

As generally known in the art, vacuum circuit breakers are used for protecting circuits and appliances by rapidly breaking circuits simultaneously with quick extinguishing arc, which is generated during an opening/closing operation of such vacuum circuit breakers under a normal load state or when shutting off fault current, in a vacuum container.

Figure 1:
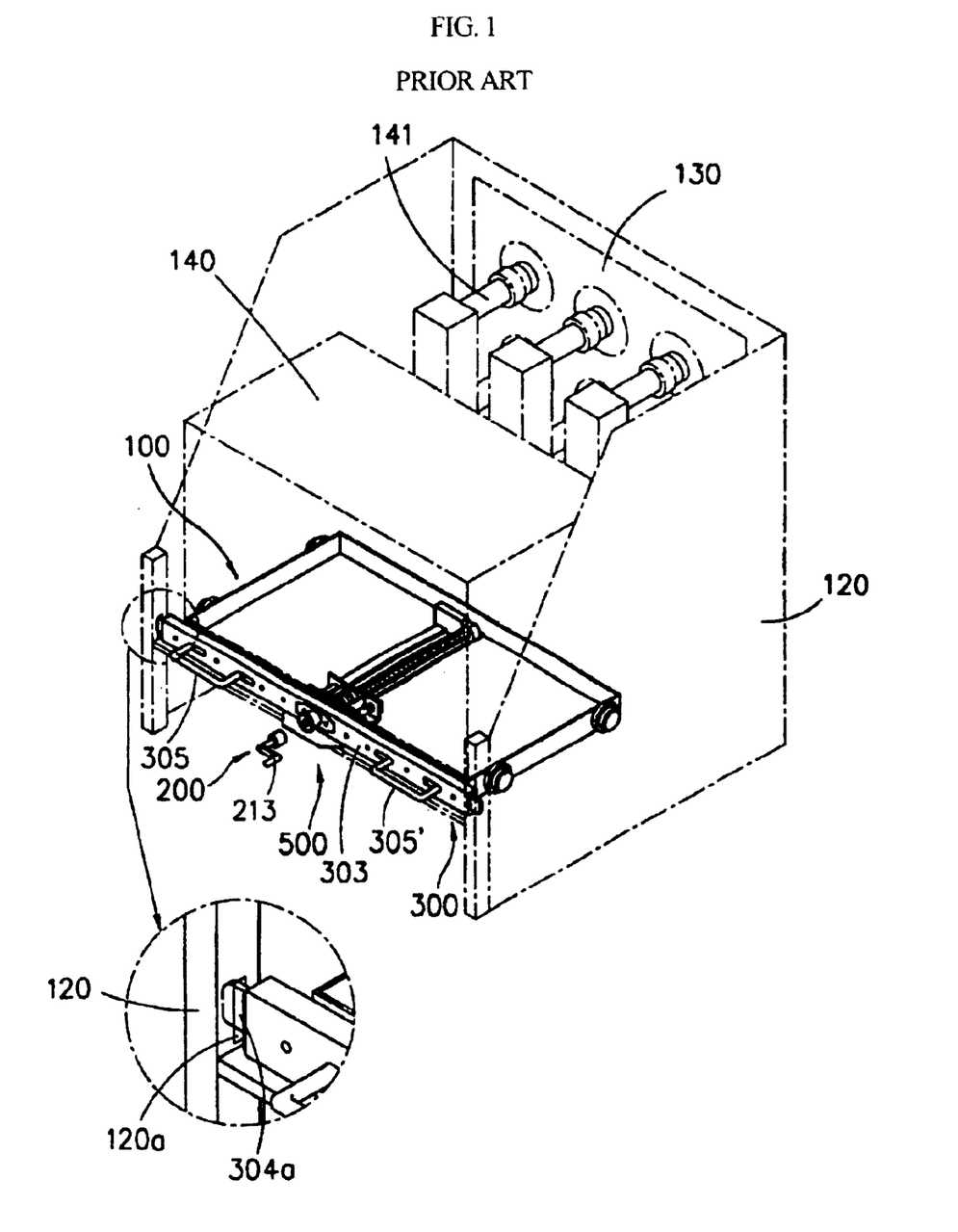
FIG. 1 is a perspective view showing a structure of a conventional vacuum circuit breaker installed in a cage having electrical load and source terminals.
Figure 5:
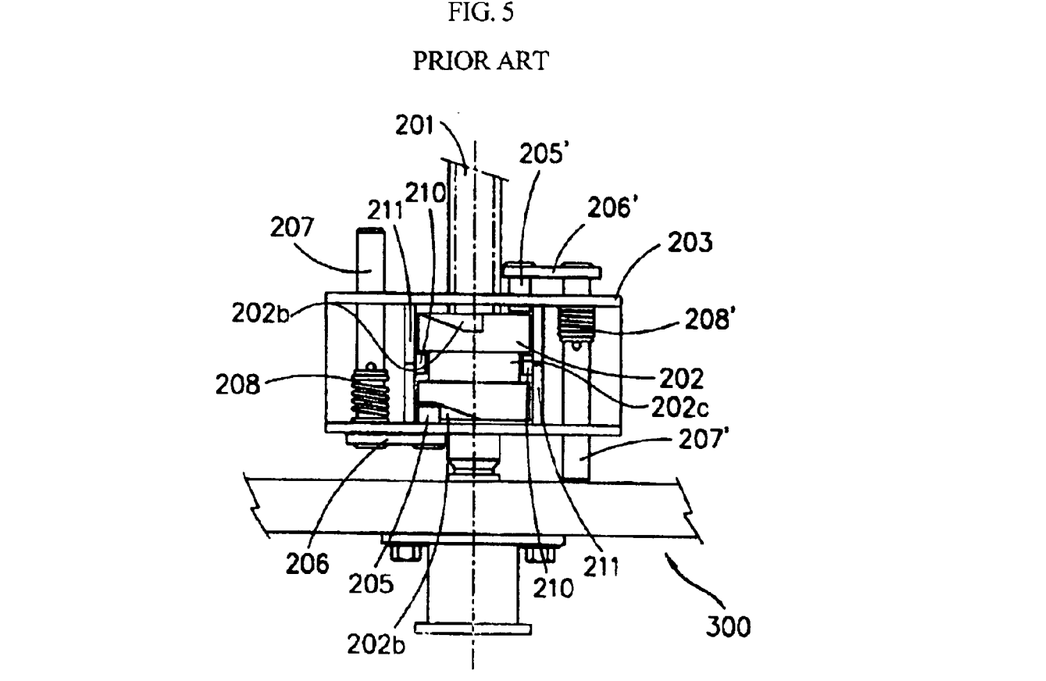
FIG. 5 is a partially enlarged view showing a conventional brake unit positioned in a test position.
Figure 6:
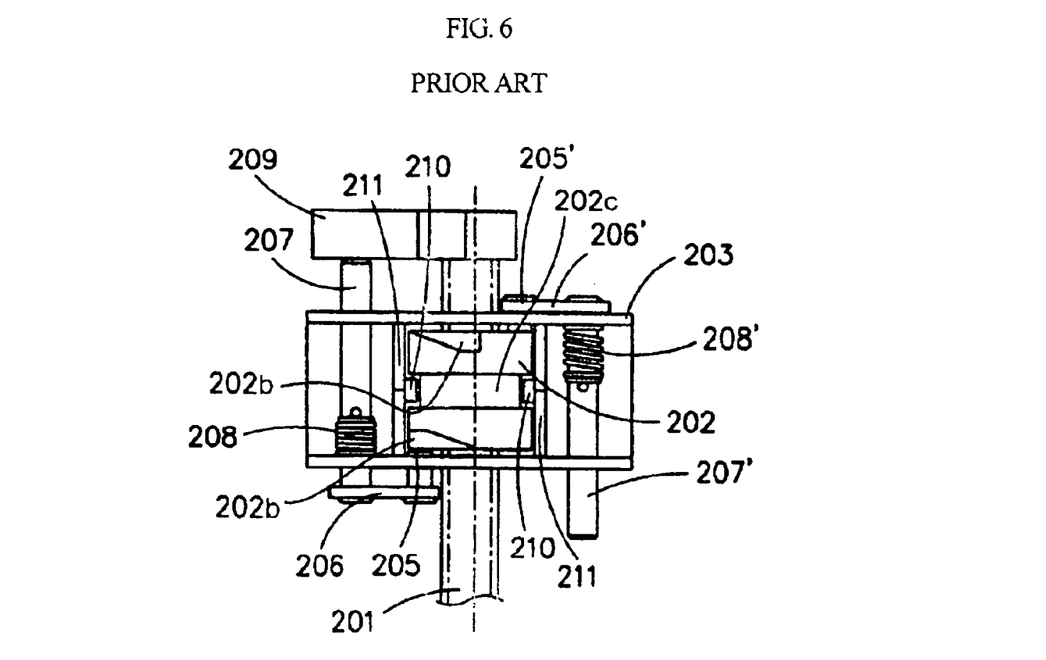
FIG. 6 is a partially enlarged view showing a conventional brake unit positioned in a run position.

Hereinafter, a conventional main switch conveying apparatus for a vacuum circuit breaker will be described with reference to FIGS. 1 to 6. The conventional main switch conveying apparatus for a vacuum circuit breaker shown in FIGS. 1 to 6 had been proposed as the German patent DE10006427C2, which was filed and patented by the same applicant as the one of this invention. FIG. 1 is a perspective view showing a structure of a conventional vacuum circuit breaker, FIGS. 2 and 3 are perspective views showing a conventional main switch conveying apparatus for the vacuum circuit breaker, FIG. 4 is a partially sectional view showing a structure of the conventional main switch conveying apparatus for the vacuum circuit breaker, FIG. 5 is a partially enlarged view showing a conventional nut assembly positioned in a safety position, and FIG. 6 is a partially enlarged view showing the conventional nut assembly positioned in a run position.

Referring to FIG. 1, the main switch conveying apparatus for the conventional vacuum circuit breaker includes a carriage 100 for conveying a main switch 140 loaded on the carriage 100 in such a manner that the main switch 140 is coupled/separated to/from electrical load and source terminals 130 installed at a rear portion of a cage 120, a carriage actuator assembly 200 for actuating the carriage 100 to move in a forward direction or a rearward direction, and a girder assembly 300 for supporting the carriage actuator assembly 200.

The carriage 100 includes a box shaped body 101 formed at an outer peripheral portion thereof with a wall section 101a (referred to FIG. 2) and an upper portion of which is opened, and two pairs of wheels 102 installed at both sides of the body 101 in such a manner that the wheels 102 can move in forward and rearward directions along guide rails (not shown) installed at both inner sidewalls of the cage 120.

Figure 2:
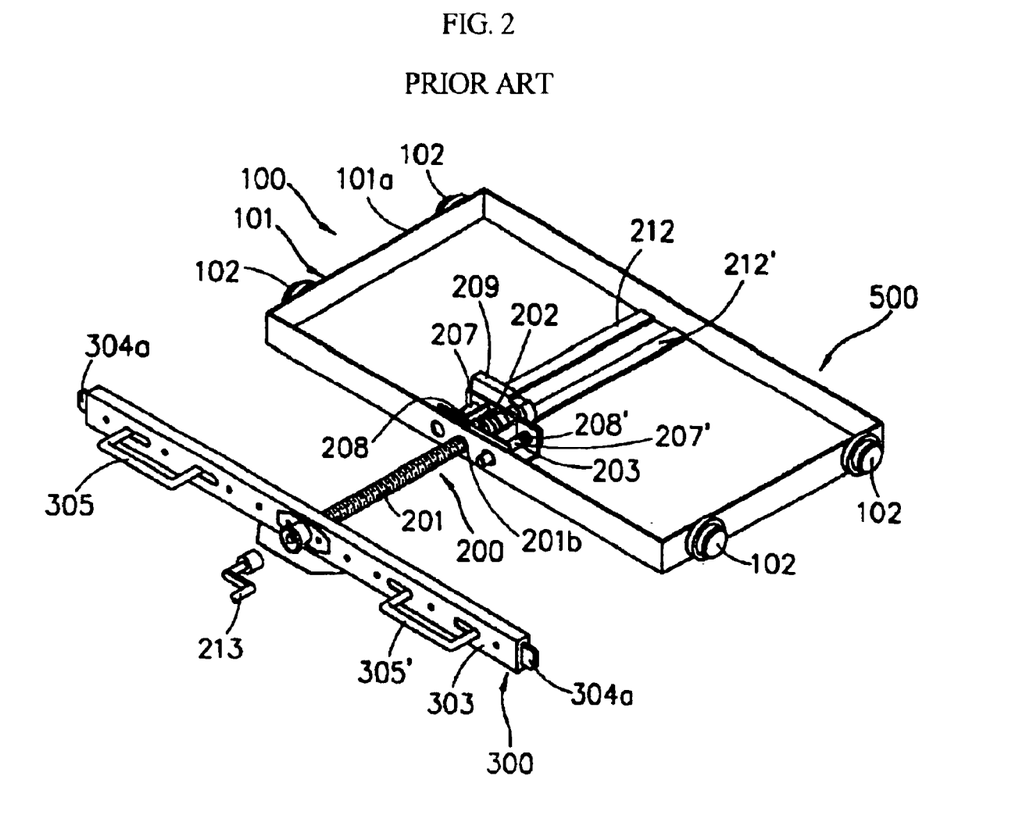
FIGS. 2 and 3 are perspective views showing a conventional main switch conveying apparatus for a vacuum circuit breaker.
Figure 3:
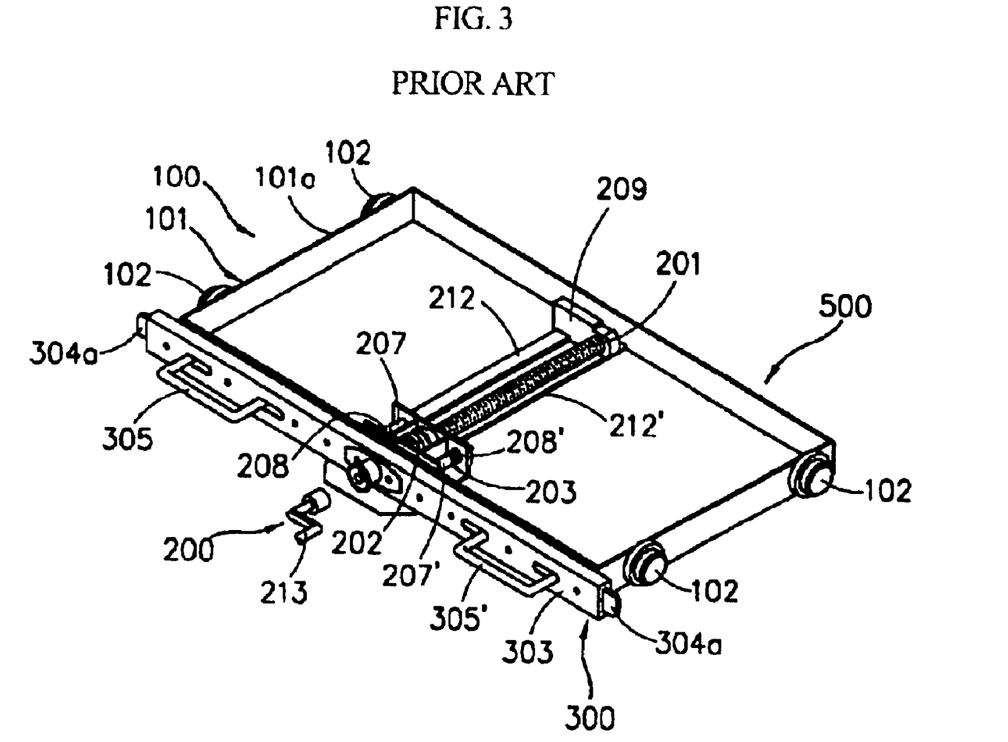
Figure 4:
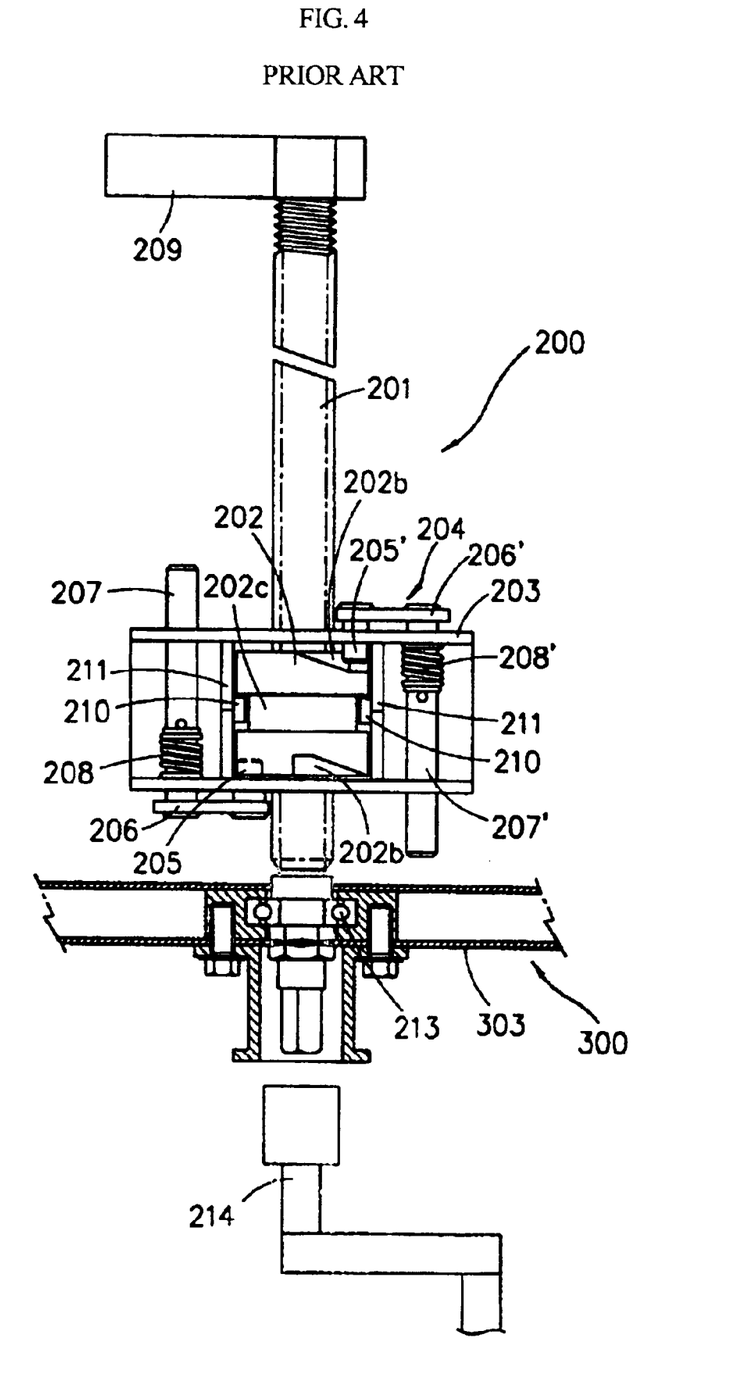
FIG. 4 is a partially sectional view showing a structure of a conventional conveying apparatus for a vacuum circuit breaker.

As shown in FIGS. 2 to 4, the carriage actuator assembly 200 includes a lead screw 201 extending by passing through a perforated hole 201b formed in a front portion of the wall section 101a of the box body 101, a conveying nut 202 installed at an inner front portion of the wall section 101a of the body 101 in such a manner that the conveying nut 202 is screw-coupled with the lead screw 201, a U-shaped bracket 203 fixed to the body 101 in order to prevent the conveying nut 202 from being decoupled from the lead screw 201, and a handle 213 detachably coupled to a front end of the lead screw 201 in order to allow a user to rotate the lead screw 201 in a forward direction or a reverse direction.

The conveying nut 202 is formed with a female screw section, which is meshed with the lead screw 201. Two guide recesses 202b having inclined surfaces are formed at upper and lower surfaces of outer circumferential of the conveying nut 202 respectively and a guide slot 202c is formed on the outer circumferential of the conveying nut 202 between the two guide recesses 202b.

In addition, a rudder 209 fixed to a rear end of the lead screw 201 can stably move in a forward direction or in a rearward direction along a pair of travel rails 212 and 212' installed at an inner portion of the body 101 of the carriage 100 in a length direction of the body 101.

The girder assembly 300 includes a support structure 303 having a cavity therein and supporting a bearing such that rotational force is transferred to the front end of the lead screw 201, which passes through a fixing hole formed at a center of the support structure 303, left and right sliding plates 304a installed in inner portions of both sides of the support structure 303 such that the left and right sliding plates 304a slidably move in left and right directions, left and right handles 305 and 305' fixed to the left and right sliding plates 304 and outwardly protruded from the support structure 303, and a spring (not shown) for biasing the left and right sliding plates 304a such that ends of the left and right sliding plates 304a are inserted into insertion holes 120a formed at both sidewalls of the cage 120.

In addition, a pair of limit pin assemblies 204 are provided in the vicinity of the conveying nut 202 so as to restrict a rotation of the conveying nut 202 in such a manner that the carriage 100 together with the conveying nut 202 is stopped at a pull out position (test position) or a connection position of the terminals and the main switch (run position) respectively.

As shown in FIGS. 5 and 6, the limit pin assemblies 204 are mounted on a U-shaped bracket 203 and a pair of support plates 211 vertically installed on the U-shaped bracket 203 to surround the nut 202. The pin assemblies 204 include limit pins 205 and 205' aligned symmetrically in a diagonal direction of the bracket 203 and one of the limit pins 205 and 205' detachably is inserted into one of the two guide recesses 202b of the nut 202 exclusively to stop the nut 202 together with the carriage 100. The limit pins 205 and 205' are connected to left and right drive pins 207 and 207' via links 206 and 206'. In addition, the left and right drive pins 207 and 207' are elastically biased to drive the limit pins 205 and 205' into a position of releasing the nut 202 rotatably by a pair of springs 208 and 208'. A guide pin 210 is inserted into a guide slot 202c of the conveying nut 202 for guiding the conveying nut 202 to mesh with the lead screw 201 stably.

Reference numerals 141, 142, 214 and 500 represent bus bars, an interrupter, a bearing and the conveying apparatus.

In order to assemble the conventional vacuum circuit breaker having the main switch conveying apparatus 500, the conveying apparatus 500 is firstly mounted on the cage 120. Then, after moving the sliding plates 304a towards a center of the girder assembly 300 by manipulating left and right handles 305 and 305' of the girder assembly 300, the girder assembly 300 is positioned in the cage 120. After that, the ends of the sliding plates 304a are inserted into insertion holes 120a formed in the sidewalls of the cage 120, thereby fixing the girder assembly 400 to the cage 120.

In this state, the carriage 100 is moved in the forward direction so as to couple the main switch 140 to the terminals 130. In operation, electric current from an electric source is applied to the vacuum interrupter (not shown) installed at an inner portion of the main switch 140 through an upper bus bar 141. Such current is outputted through a lower bus bar (not shown) to a electric load via terminals 130. When an accident current such as a large current due to a circuit shortage or over current etc. occurs during the operation, the interrupter instantaneously shuts off the circuit by separating a movable contact from a stationary contact in the container of the interrupter.

Then, the operation that the main switch 140 is separated from the terminals 130 for maintenance work such as test is explained as follows. Firstly, in an initial state in which the main switch 140 is coupled to the terminals 130, a worker couples the handle 213 to the front end of the lead screw 201. Then, if the worker rotates the lead screw 201 counterclockwise, the conveying nut 202 and carriage 100 moves to approach the girder assembly 300 along the lead screw 201. Thus, the main switch 140 is moved backwards so that the main switch 140 is separated from the terminals 130.

After performing repair work in a state in which the main switch 140 has been separated from the terminals 130, the operation that the main terminals 140 is again coupled to the terminals 130 is explained as follows. At this time, the worker rotates the lead screw 201 clockwise by manipulating the handle 213, so the carriage 100 moves to depart from the girder assembly 300 so that the main switch 140 is coupled to the terminals 130.

The movement of the conveying nut 202 on the lead screw 201 in the forward or rearward direction is restricted by the limit pin assembly 204. When the carriage 100 has been completely pulled out to approach the girder assembly 300 as shown in the FIG. 3, in other words at the test position, the conveying nut 202 has been completely moved in the rearward direction along the lead screw 201 so that the right drive pin 207' contacts with one side wall of the girder assembly 300. Thus, the limit pin 205' is apart from the guide recess 202b, so that the conveying nut 202 idles without moving in the forward or rearward direction.

However, the above mentioned main switch conveying apparatus is only adaptable for moving the main switch between two positions, such as the test position and the run position of the vacuum circuit breaker. In a recent power distribution system, it is required that the main switch should be positioned between three positions, such as a safety position, a test position and a run position, for improving safety. Thus, the conventional main switch conveying apparatus is not adaptable for a state-of-art vacuum circuit breaker. Although it is possible to move the main switch between three positions by modifying the structure of the conventional main switch conveying apparatus, the number of parts is increased, an assembling process thereof is complicated, and a manufacturing cost thereof is increased while lowering a preciseness of an operation.

In addition, since a braking apparatus for stopping and locking the carriage at each of the three positions is not provided, a worker cannot easily recognize the position of the main switch of the vacuum circuit breaker. Thus, the worker manipulates the main switch conveying apparatus in the reverse direction of his intention, the carriage can be moved to the reverse direction of user's intention, so that risk is high.

SUMMARY OF THE INVENTION

Accordingly, the present invention has been made to solve the above-mentioned problems occurring in the prior art, and an object of the present invention is to provide a main switch conveying apparatus for a vacuum breaker including a braking means capable of stopping a main switch at a test position, a safety position, and an operating position. And another object of the present invention is to provide a main switch conveying apparatus for a vacuum breaker including a braking means capable of locking a position of the main switch at above three position to avoid an erroneous operation.

To accomplish the above object, the present invention provides a main switch conveying apparatus for a vacuum circuit breaker installed in a cage having electrical load and source terminals, the main circuit conveying apparatus comprising:

a carriage for conveying the main switch loaded on the carriage in such a manner that the main switch is coupled to or separated from the terminals;

a carriage actuating assembly including a lead screw for providing a driving force to move the carriage and provided with braking recesses at the predetermined positions on the lead screw in such a manner that the carriage is stopped at a test position, a safety position and a run position of the main circuit and a conveying nut fixed on the carriage to mesh with the lead screw and movable together with the carriage relatively to the lead screw;

a girder assembly detachably supported on both front sidewalls of the cage for supporting one end of the lead screw to rotate;

a brake assembly installed on the carriage for stopping the carriage by locking the lead screw at positions of the braking recesses; and a brake releasing assembly for releasing the locking of the brake assembly to allow the carriage to move again.

BRIEF DESCRIPTION OF THE DRAWINGS

The above and other objects, features and advantages of the present invention will be more apparent from the following detailed description taken in conjunction with the accompanying drawings, in which:

FIGS. 11 to 13 are figures showing construction and operational states of a brake assembly and a brake-release assembly of the conveying apparatus for a vacuum circuit breaker according to an exemplary embodiment of the present invention.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 7:
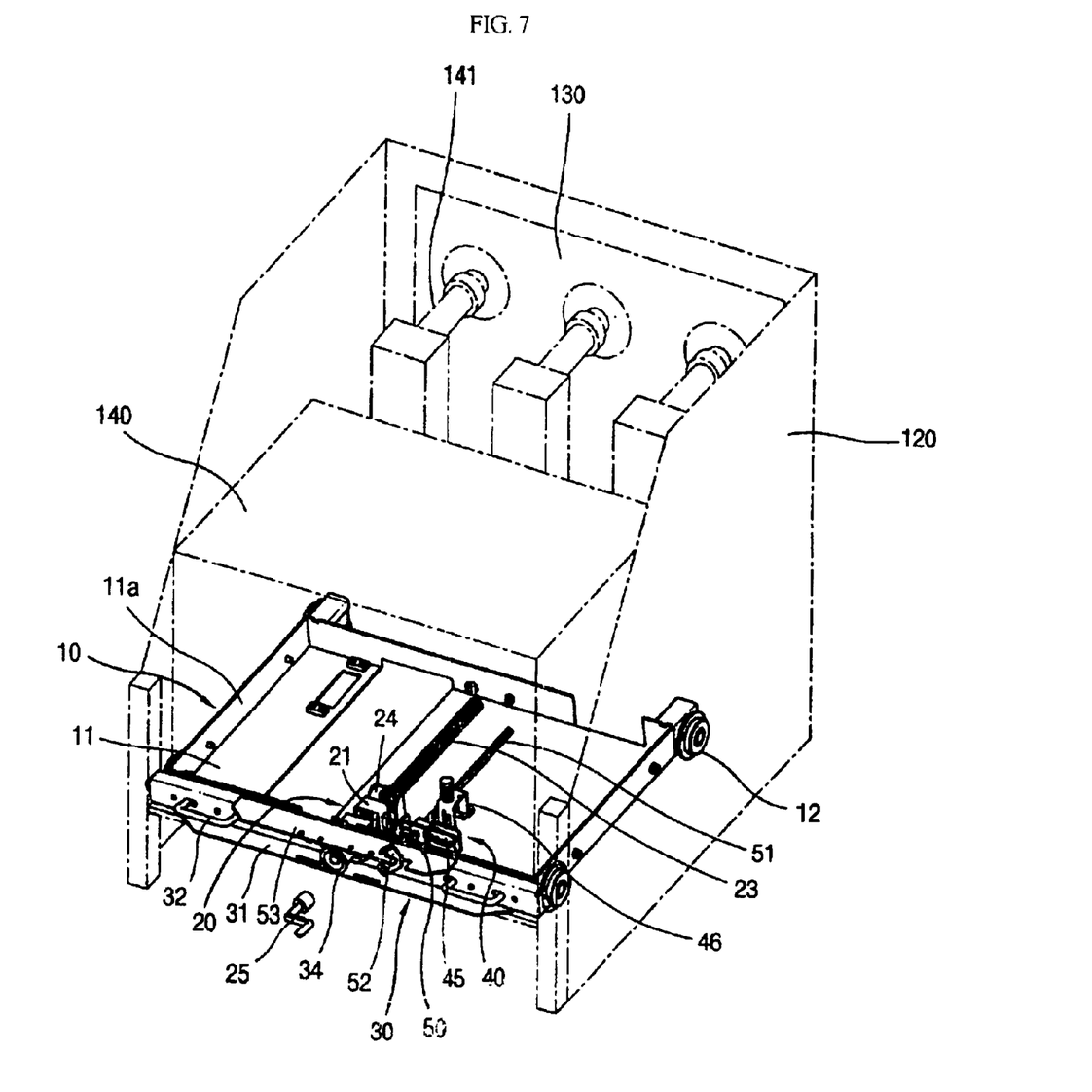
FIG. 7 is a perspective view showing a structure of a vacuum circuit breaker according to an exemplary embodiment of the present invention.
Figure 8:
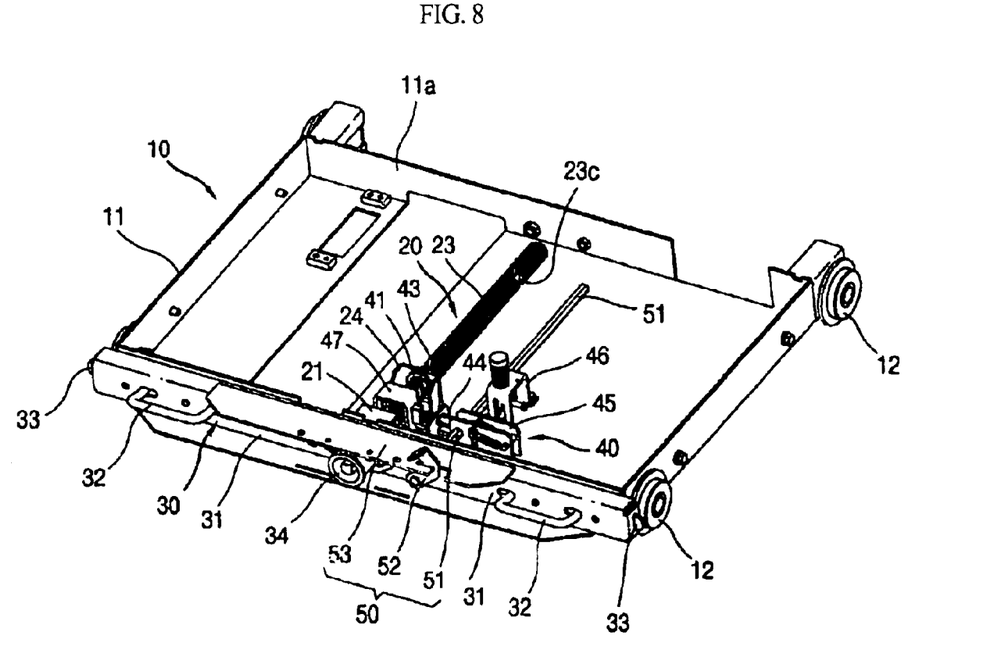
FIGS. 8 and 9 are perspective views showing a main switch conveying apparatus for a vacuum circuit breaker according to an exemplary embodiment of the present invention.
Figure 9:
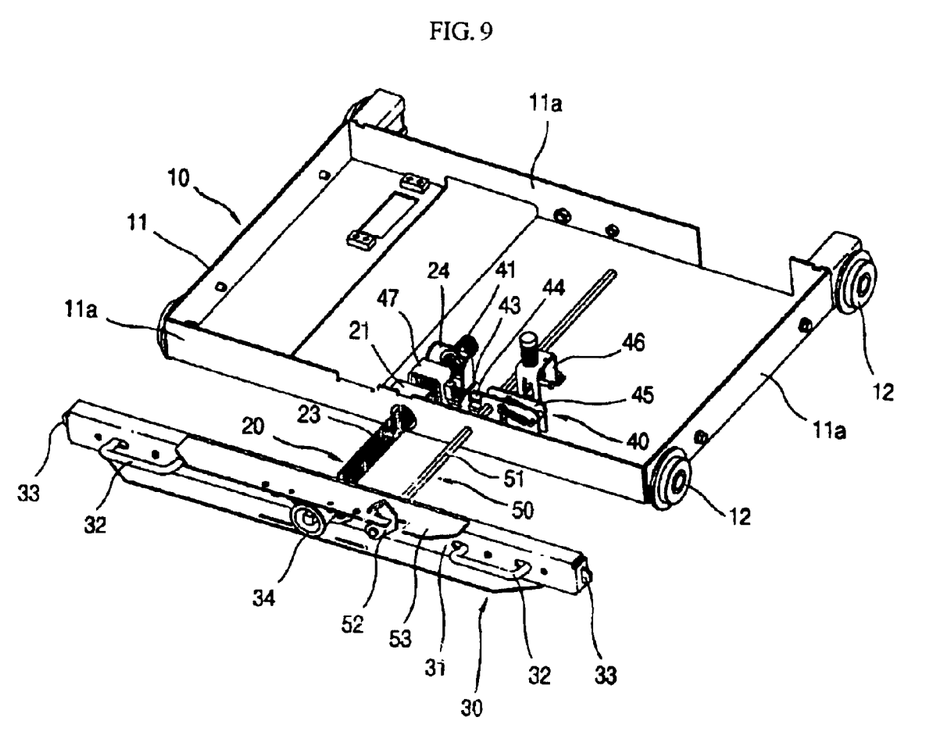

As shown in the FIG. 7, according to one embodiment of the invention, a vacuum circuit breaker is installed in a cage 120 and the cage 120 has electrical load and source terminals 130 at its rear portion. A main switch conveying apparatus for such breaker comprises a carriage 10 for conveying the main switch 140 loaded on the carriage 10 in such a manner that the main switch 140 is coupled to or separated from the terminals 130; a carriage actuating assembly 20 including a lead screw 23 for providing a driving force to move the carriage 10 and provided with braking recesses at the predetermined positions on the lead screw 23 in such a manner that the carriage 10 is stopped at a test position, a safety position and a run position of the main circuit, and a conveying nut 22 (referring to FIG. 10) fixed on the carriage 10 to mesh with the lead screw 23 and movable together with the carriage 10 relatively to the lead screw 23; a girder assembly 30 detachably supported on both front sidewalls of the cage 120 for supporting one end of the lead screw to rotate; a brake assembly 40 installed on the carriage 10 for stopping the carriage 10 by locking the lead screw 23 at positions of the braking recesses; and a brake releasing assembly 50 for releasing the locking of the brake assembly 40 to allow the carriage 10 to move again.

The carriage 10 includes a box shaped body 11 formed at an outer peripheral portion thereof with a wall 11a and an upper portion of which is opened, and two pairs of wheels 12 installed at both sidewalls of the body 11 in such a manner that the wheels 12 can move in forward and rearward directions along guide rails (not shown) installed at both inner sidewalls of the cage 120.

The carriage actuating assembly 20 desirably further includes nut fixing bracket 21 by which the nut 22 is fixed to a front wall 11a of the body 11 such that the conveying nut 22 is movable together with the carriage 10 while being maintained in a fixed position relatively to the carriage 10, a guide bracket 24 spaced apart from the nut fixing bracket 21 by a predetermined distance while guiding the lead screw 23 to stably move in the forward or rearward direction, and a handle 25 detachably coupled to a front end of the lead screw 23 to allow a worker to rotate the lead screw 23 clockwise or counterclockwise.

The lead screw 23 is formed at one side thereof with braking recesses 23a, 23b and 23c so that the carriage 10 can be positioned at the safety position, the test position and the run position of the main switch by means of the brake assembly 40.

The girder assembly 30 includes a body 31 having a cavity therein and formed at a center thereof with a handle coupling portion 34 for allowing the handle 25 to couple with a front end of the lead screw 23, a pair of sliding bars 33 installed in inner portions of both sides of the body 31 respectively such that the sliding bars 33 sliding move in horizontally, that is left and right directions, a pair of handle bars 32 integrally provided with the sliding bars 33 and outwardly protruded from the body 31, and a spring (not shown) for biasing the sliding bars 33 such that ends of the sliding bars 33 are inserted into insertion holes (not shown) formed at both sidewalls of the cage 120.

Figure 10:
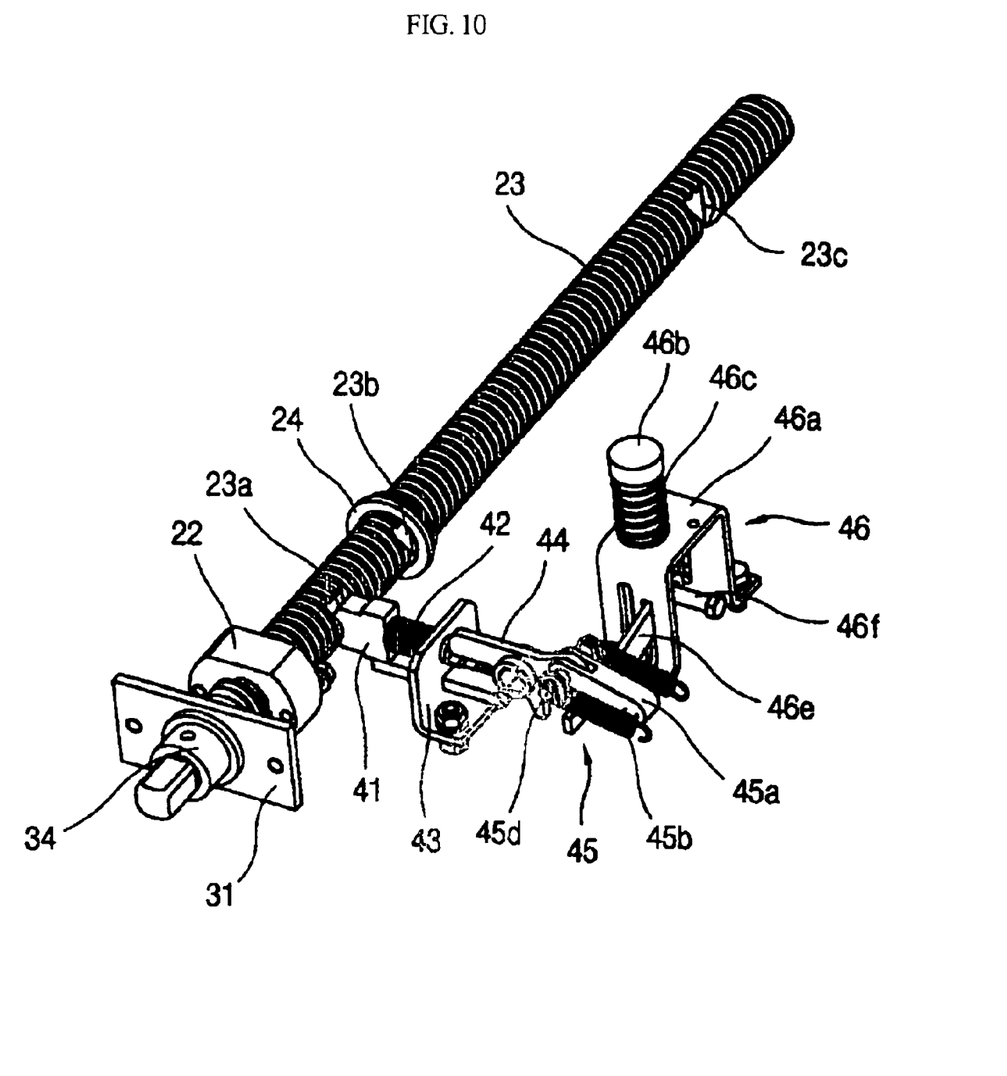
FIG. 10 is an exploded perspective view showing only a main part of the conveying apparatus according to an exemplary embodiment of the present invention.

Referring to the FIGS. 7–13 especially to the FIG. 10, brake assembly 40 includes a stopper 41 movable to a locking position of the lead screw 23 and releasing position of the lead screw 23; a first guide bracket 47 fixed on a bottom surface of the carriage 10 for guiding a leading end of the stopper 41 opposing the lead screw 23; a second guide bracket 43 fixed on a bottom surface of the carriage for guiding a rear portion of the stopper 41; a spring for elastically biasing the stopper 41 to contact with the lead screw 23; and a latch 44 rotatable to a latching position of the stopper 41 and a releasing position of the stopper 41. The stopper 41 has three parts integrally coupled with one another, the first part having point end opposing the lead screw 23; the second part having cylindrical body with one end connected to the first part, the other end latched or released by the latch 44 and spring 42 installed between the both ends; a plate shaped third part having one end connected to a lower portion of the first part and the other end extending through the second guide bracket 43 to oppose a lower end portion of the latch 44. The second part of the stopper 41 extends passing through the second guide bracket 43 to oppose the latch 44.

As shown on the FIG. 10, latch 44 has a center through hole for allowing the latch actuating shaft 51 to pass through and is rotatably supported by a latch supporting bracket 45c. A toggle spring assembly 45 is provided to apply elastic force to one end of the latch 44.

As it can be seen on the FIG. 10–13, toggle spring assembly 45 for biasing the latch 44 to the latching position, includes a supporting bracket 45c for supporting the latch rotatably; a swing link 45a connected to the latch by a pin 45d for swinging in accordance with rotating of the latch 44; and a pair of springs 45b, each spring 45b having one end fixed on the pin and the other end fixed on the supporting bracket 45c for biasing the latch 44 to position of the latching position. In addition, a lock assembly 46 is provided near the toggle spring assembly 45 for locking the latching position of the latch 44.

Referring to the FIG. 10–13, the lock assembly 46 includes a lock 46e rotatable to a locking position of the latching of the latch 44 or unlocking position of the latching of the latch 44; the vertically movable member 46b connected to one end of the lock 46e for actuating the lock 46e to the locking position or the unlocking position; a supporter 46d for supporting the lock 46e rotatably; a bracket 46a for supporting the vertically movable member 46b; and a spring 46c for biasing the vertically movable member 46b to make the lock 46e to be unlocked. A designating symbol "46f" is a pin for connecting the lock 46e with the vertically movable member 46b.

Figure 11:
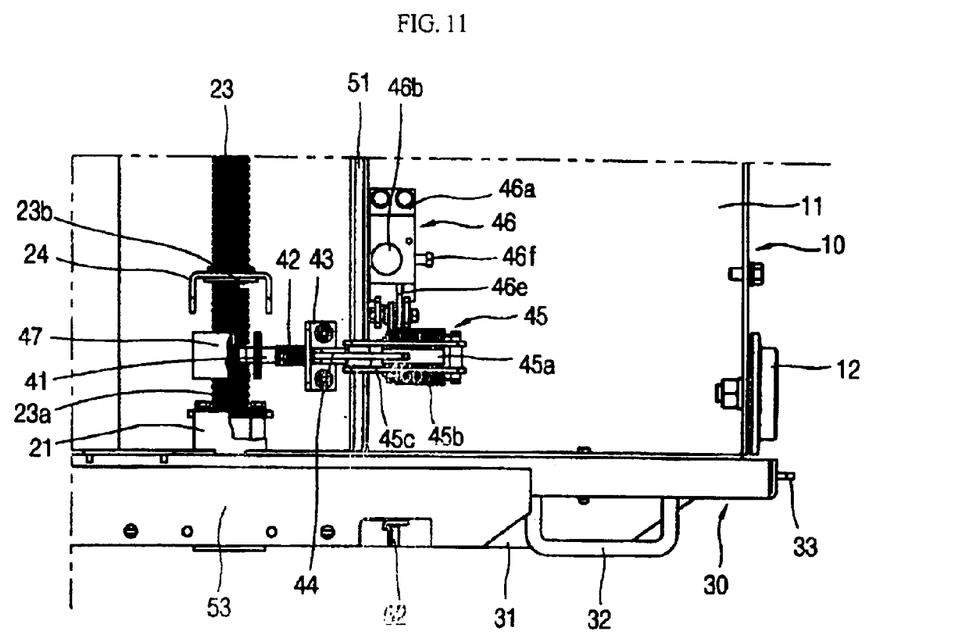
FIG. 11 is a partial planar view of the conveying apparatus for a vacuum circuit breaker according to an exemplary embodiment of the present invention.
Figure 12:
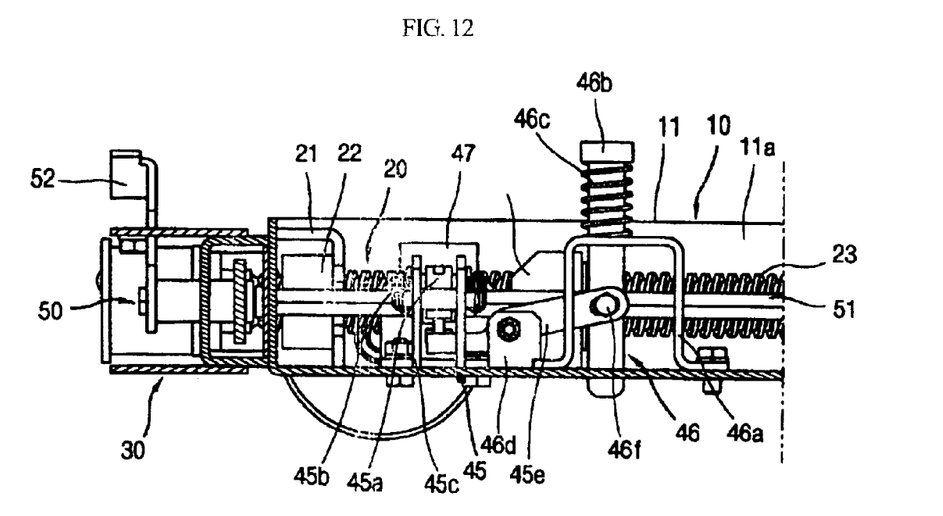
FIG. 12 is a partial enlarged sectional view of the conveying apparatus for a vacuum circuit breaker according to an exemplary embodiment of the present invention.

Referring to the FIGS. 7, 11 and 12, the brake releasing assembly 50 includes the latch actuating shaft 51 connected to the latch 44 for transferring rotational force to the latch 44;

and a lever 52 connected to one end of the latch actuating shaft 51 for actuating the shaft 51 manually. Wherein the shaft 51 has a hexagonal sectional shape and the corresponding center through hole of the latch 44 also has the same sectional hexagonal shape. The lever 52 and lever guide plate 53 for guiding the actuating lever 52 are installed at the front wall of the body 31.

Hereinafter, an operation of the main switch conveying apparatus for the vacuum circuit breaker according to the present invention will be described. Firstly, the user inserts the handle 25 into the handle coupling portion 34 of the girder assembly 30 and rotates one end of the lead screw 23 supported by the girder assembly 30 clockwise or counterclockwise. Then, the conveying nut 22 fixed to the front portion of the carriage 10 is moved lengthwise of the lead screw 23 on the lead screw 23 in a forward or a rearward direction.

Accordingly, as seen on the FIG. 7, the main switch 140 of the vacuum circuit breaker mounted on the carriage 10 advances or retreats along the lead screw 23 according to the movement of the conveying nut 22. At this time, due to the guide bracket 24 installed at the center of the carriage 10, the carriage 10 having the main switch 140 of the vacuum circuit breaker can stably move in the forward or rearward direction smoothly without vibration.

In addition, when the main switch 140 loaded on the carriage 10 advances or retreats along the lead screw 23 by means of a rotational movement of the lead screw 23, if a front end of the stopper 41 moving along the lead screw 23 while contacting with one side of the lead screw 23 by means of the spring 42 is inserted into the first braking recess 23a corresponding to a "safety position" of the main switch 140, a surface of the first braking recess 23a contacts with an inclined surface formed at a tip of the stopper 41, so repelling force is applied to the stopper 41, biasing the stopper 41 backwardly. However, since the latch 44 is rotated to the latching position by the toggle spring assembly 45, the stopper 41 can be maintained in the safety position without repelling. Accordingly, the rotation of the lead screw 23 is stopped, so the main switch 140 of the vacuum circuit breaker is stopped in the safety position.

In addition, in order to convey again the main switch 140 of the vacuum circuit breaker installed on the upper portion of the carriage 10, if a user holds the lever 52 and turns the lever 52 in clockwise direction by a predetermined degree, the shaft 51 is rotated clockwise by a predetermined degree, too. Thus, the latch 44, which is coupled with the shaft 51, rotates in clockwise by a predetermined degree also, so that the stopper 41 unlocked the lead screw 23, that is the lead screw 23 is released. Accordingly, the front end of the stopper 41 leaves the first brake recess 23a due to the repelling force from the lead screw 44, so the carriage 10 having the main switch of the vacuum circuit breaker can be advanced or retreated again along the lead screw 23 by means of the rotational movement of the lead screw 23.

Figure 13:
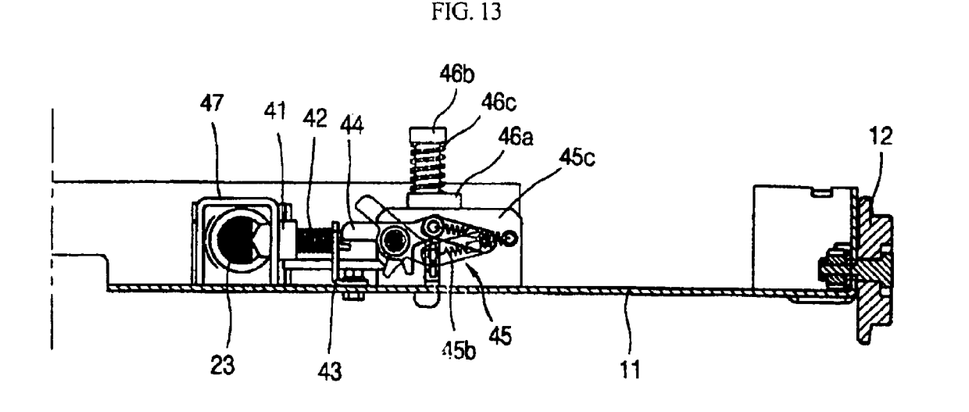
FIG. 13 is a partial enlarged sectional view of the conveying apparatus according to an exemplary embodiment of the present invention showing the operation of the brake assembly and a brake-release assembly.

At this time, the latch 44 can be maintained in the present position of releasing the stopper 41 as a state shown by a dot line on the FIG. 13, such state can be accomplished by a toggle movement of the latch 44, pin 45d, swing link 45a and spring 45b from a position shown as a solid line to a position shown as the dot line on the FIG. 13 or vice versa.

After then, if the user rotates the lead screw 23 in counterclockwise direction by the handle 25 in order to convey the main switch 140 to the test position or run position, the stopper 41 leaves the first brake recess 23a due to the repelling force from the lead screw 44 and retreats as far as a depth of the first braking recess 23a. Thus, at this time, the third part of the stopper 41 having the end extending to oppose the lower end portion of the latch 44 retreats too, so the retreating end of the third part pushes the lower end portion of the latch 44 to rotate the latch 44 in counterclockwise direction as referring the FIG. 10 or FIG. 13. So, the latch 44 comes to a state of ready for latching the stopper 41. And When the stopper 41 reaches the next braking recess, that is the second braking recess 23b of the test position, the first part of the stopper 41 is moved into the second braking recess 23b by biasing of the spring 42 and the lead screw 44 is stopped. The carriage 10 and the main switch 140 stop at the position of test.

By repeating the above processes, the main switch 140 of the vacuum circuit breaker is advanced/retreated into/from the "run" position, "test" position and "safety" position. Such operation will not be described for avoiding the repetition.

In the mean time, if an actuator means (not shown) operates and press the vertically movable member 46b of the lock assembly 46 to a lower position, the lock 46e pushes up the connecting point, that is rotating center of the latch 44 and link 45a. So, even if a user tries to rotate the shaft 51 by the lever 52, the latch 44 is locked by the lock 46e and it is not possible for user to rotate the shaft 51. Thus, even if a unauthorized man tries to release the latch 44 and conveys to the main switch 140, such an action is not allowed due to the lock assembly 46 according to the present invention.

Therefore as above mentioned, when the user conveys the main switch of the vacuum circuit breaker, the main switch can be rapidly and easily conveyed into the safety position, the test position and the run position. In addition, the carriage loaded the main switch can be stopped at each of the safety position, the test position and the run position. Thus, the user can easily recognize the position of the carriage, that is the main switch. In addition, the main switch conveying apparatus for the vacuum circuit breaker according to the present invention has a simple structure and a smaller number of parts, thereby shortening an assembling time thereof.

The main circuit moving apparatus of the present invention can be applied to various appliances, in which a moving distance of an article or an object must be precisely controlled.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A main switch conveying apparatus for a vacuum circuit breaker installed in a cage having electrical load and source terminals, the main switch conveying apparatus comprising:

a carriage for conveying the main switch loaded on the carriage in such a manner that the main switch is coupled to or separated from the terminals;

a carriage actuating assembly including a lead screw for providing a driving force to move the carriage and provided with braking recesses at the predetermined positions on the lead screw in such a manner that the carriage is stopped at a test position, a safety position and a run position of the main switch, and a conveying nut fixed on the carriage to mesh with the lead screw and movable together with the carriage relatively to the lead screw;

a girder assembly detachably supported on both front sidewalls of the cage for supporting one end of the lead screw to rotate;

a brake assembly installed on the carriage for stopping the carriage by locking the lead screw at positions of the braking recesses; and a brake releasing assembly for releasing the locking of the brake assembly to allow the carriage to move again.

2. The main switch conveying apparatus as claimed in claim 1, wherein the brake assembly comprises;

a stopper movable to a locking position of the lead screw and releasing position of the lead screw;

a first guide bracket fixed on a bottom surface of the carriage for guiding a leading end of the stopper opposing the lead screw;

a second guide bracket fixed on a bottom surface of the carriage for guiding a rear portion of the stopper;

a spring for elastically biasing the stopper to contact with the lead screw; and a latch rotatable to a latching position of the stopper and a releasing position of the stopper.

3. The main switch moving apparatus as claimed in claim 2 further comprising a toggle spring assembly for biasing the latch to the latching position.

4. The main switch conveying apparatus as claimed in claim 3, wherein the toggle spring assembly comprises;

a supporting bracket for supporting the latch rotatably;

a swing link connected to the latch by a pin for swinging in accordance with rotating of the latch; and a spring having one end fixed on the pin and the other end fixed on the supporting bracket for biasing the latch to position of the latching position.

5. The main switch conveying apparatus as claimed in claim 3, further comprising a lock assembly lockable the latching position of the latch.

6. The main switch conveying apparatus as claimed in claim 5, wherein the lock assembly comprises;

a lock for locking the latching position of the latch; and a vertically movable member connected to the lock for actuating the lock.

7. The main switch conveying apparatus as claimed in claim 6, wherein the lock assembly comprises;

the lock rotatable to a locking position of the latching of the latch or unlocking position of the latching of the latch;

the vertically movable member connected to one end of the lock for actuating the lock to the locking position or the unlocking position;

a supporter for supporting the lock rotatably;

a bracket for supporting the vertically movable member; and a spring for biasing the vertically movable member to make the lock to be unlocked.

8. The main switch conveying apparatus as claimed in claim 1, wherein the brake releasing assembly comprises;

a latch actuating shaft connected to the latch for transferring rotational force to the latch; and a lever connected to one end of the latch actuating shaft for actuating the shaft manually.

9. The main switch conveying apparatus as claimed in claim 2, wherein the brake releasing assembly comprises;

a latch actuating shaft connected to the latch for transferring rotational force to the latch; and a lever connected to one end of the latch actuating shaft for actuating the shaft manually.

\* \* \* \* \*